United States Patent [19]

York et al.

[11] Patent Number: 5,598,908
[45] Date of Patent: Feb. 4, 1997

[54] MAGNETORHEOLOGICAL FLUID COUPLING DEVICE AND TORQUE LOAD SIMULATOR SYSTEM

[75] Inventors: Todd M. York, Novi; Curt D. Gilmore, Fenton; Thomas G. Libertiny, Farmington, all of Mich.

[73] Assignee: GSE, Inc., Farmington Hills, Mich.

[21] Appl. No.: 460,968

[22] Filed: Jun. 5, 1995

[51] Int. Cl.⁶ .................................................. F16D 27/00
[52] U.S. Cl. ....................... 192/21.5; 192/84.3; 192/84.4; 188/267
[58] Field of Search ................................. 192/21.5, 84.3, 192/84.4; 188/267, 268

[56] References Cited

U.S. PATENT DOCUMENTS

| | | |
|---|---|---|
| 2,417,850 | 3/1947 | Winslow . |
| 2,488,827 | 11/1949 | Pensabene ........................ 192/21.5 X |
| 2,773,206 | 12/1956 | Zozulin et al. . |
| 2,811,066 | 10/1957 | Nelson . |
| 2,815,106 | 12/1957 | Leff et al. .............................. 192/21.5 |
| 2,829,747 | 4/1958 | Morse ..................................... 192/21.5 |
| 2,870,888 | 1/1959 | Gill, Jr. . |
| 2,886,151 | 5/1959 | Winslow . |
| 2,967,980 | 1/1961 | Ovshinsky . |
| 2,983,349 | 5/1961 | Meiklejohn . |
| 2,996,162 | 8/1961 | Lehde ..................................... 192/21.5 |
| 3,001,619 | 9/1961 | Imperi ..................................... 192/21.5 |
| 3,047,507 | 7/1962 | Winslow . |
| 3,074,523 | 1/1963 | Yeiser . |
| 3,085,407 | 4/1963 | Tomlinson . |
| 3,106,850 | 10/1963 | Clisset . |
| 3,144,921 | 8/1964 | Martinek . |
| 3,150,678 | 9/1964 | Nuber . |
| 3,216,542 | 11/1965 | Comstock, 3rd. . |
| 3,221,849 | 12/1965 | Klass et al. . |
| 3,250,341 | 5/1966 | Yakahashi . |
| 3,255,853 | 6/1966 | Klass et al. . |
| 3,266,606 | 8/1966 | Barrett . |
| 3,305,055 | 2/1967 | Slaughter . |
| 3,373,355 | 3/1968 | Klass et al. . |
| 3,385,793 | 5/1968 | Klass et al. . |
| 3,394,783 | 7/1968 | Searle . |
| 3,394,784 | 7/1968 | Searle ..................................... 192/21.5 |
| 3,427,247 | 2/1969 | Peck . |
| 3,439,787 | 4/1969 | Minciotti et al. . |
| 3,538,469 | 11/1970 | Litte et al. . |
| 3,620,584 | 11/1971 | Rosensweig . |
| 3,917,538 | 11/1975 | Rosensweig . |
| 4,019,589 | 4/1977 | Wallace . |
| 4,050,266 | 9/1977 | Bergman . |
| 4,065,234 | 12/1977 | Yoshiyuki et al. . |
| 4,200,003 | 4/1980 | Miller . |
| 4,200,296 | 4/1980 | Stahl et al. . |
| 4,239,092 | 12/1980 | Janson . |
| 4,357,024 | 11/1982 | Raj . |
| 4,379,492 | 4/1983 | Hiraoka . |
| 4,418,764 | 12/1983 | Mizobe . |
| 4,429,775 | 2/1984 | Teramoto . |
| 4,444,298 | 4/1984 | Stangroom . |
| 4,528,894 | 7/1985 | Crosby . |
| 4,531,846 | 7/1985 | Raj . |
| 4,553,948 | 11/1985 | Tatsuno . |
| 4,630,943 | 12/1986 | Stahl et al. . |
| 4,664,236 | 5/1987 | Stangroom . |
| 4,694,213 | 9/1987 | Gowda et al. . |

(List continued on next page.)

*Primary Examiner*—Andrea L. Pitts
*Attorney, Agent, or Firm*—Harness, Dickey & Pierce, P.L.C.

[57] ABSTRACT

A fluid coupling device for coupling torque between two members and utilizing a magnetorheological fluid having a controllable yield strength in shear in response to a magnetic field and having a determinable viscosity in the absence of a magnetic field and with the coupling device having a rotor, rotatably supported in a cavity in a housing with the cavity filled with the magnetorheological fluid and with the cavity and rotor having similarly shaped contours and constructed to concentrate the magnetic coupling effect through the fluid at the radially outer end of the rotor and a torque load simulator system utilizing the fluid coupling for determining the performance of a torque tool or other torque related apparatus relative to a predetermined standard of performance.

24 Claims, 5 Drawing Sheets

U.S. PATENT DOCUMENTS

| | | |
|---|---|---|
| 4,772,032 | 9/1988 | Raj et al. . |
| 4,772,407 | 9/1988 | Carlson . |
| 4,782,927 | 11/1988 | Sproston et al. . |
| 4,785,693 | 11/1988 | Minamiyama et al. . |
| 4,790,522 | 12/1988 | Drutchas . |
| 4,802,560 | 2/1989 | Bhadra et al. . |
| 4,849,120 | 7/1989 | Price et al. . |
| 4,875,528 | 10/1989 | Thackston . |
| 4,896,754 | 1/1990 | Carlson et al. . |
| 4,898,266 | 2/1990 | Garrett et al. . |
| 4,898,267 | 2/1990 | Garrett et al. . |
| 4,951,756 | 8/1990 | Everett et al. . |
| 4,967,852 | 11/1990 | Tatsuno . |
| 4,969,545 | 11/1990 | Hayashi ............................ 192/21.5 X |
| 5,007,513 | 8/1991 | Carlson . |
| 5,030,865 | 7/1991 | Rockey et al. . |
| 5,054,593 | 10/1991 | Carlson . |
| 5,080,181 | 1/1992 | Tatsuno . |
| 5,090,531 | 2/1992 | Carlson . |
| 5,094,328 | 3/1992 | Palmer . |
| 5,094,329 | 3/1992 | Maguire . |
| 5,108,639 | 4/1992 | Block et al. . |
| 5,113,949 | 5/1992 | Ohkubo et al. . |
| 5,127,607 | 7/1992 | McGuire . |
| 5,156,247 | 10/1992 | Wiese et al. . |
| 5,161,658 | 11/1992 | Hagiwara . |
| 5,181,575 | 1/1993 | Maruyama et al. . |
| 5,238,095 | 8/1993 | Pedu .................................. 188/267 X |
| 5,293,619 | 3/1994 | Dean . |

MAGNETORHEOLOGICAL FLUID COUPLING DEVICE AND TORQUE LOAD SIMULATOR SYSTEM

SUMMARY BACKGROUND OF THE INVENTION

The present invention relates in general to fluid coupling apparatus for load and/or torque control and for use in a torque load simulator system.

As noted in U.S. Pat. No. 5,054,593 various types of electroactive fluids have been developed which consist of suspensions of very fine particles in a dielectric liquid media. Electroactive fluids experience changes in their properties in the presence of an electric field and have been used in various mechanical applications. One type of electroactive fluid is an electrorheological or "electroviscous" fluid. Electrorheological fluids are electroactive fluids which in the presence of an electric field of a high magnitude can exhibit a shear stress characteristic which increases with increasing electric field strength. Such electrorheological fluids have been utilized for variable clutch or brake assemblies. The electrorheological fluid devices, however, require the application of substantially high voltages in order to obtain the electric field of desired strength.

The '593 patent makes reference to another type of electroactive fluid which is an electrophoretic or "electroseparable" fluid. Electrophoretic fluids are suspensions similar to electrorheological fluids but are characterized by a different response to an applied electric field. The particles within electrophoretic fluids exhibit an electrophoretic migration. Generally, the electrophoretic action may be accomplished and maintained at much lower electric fields, since electrophoresis is a linear phenomenon with respect to electric field strength. However, the strength of an electrotheological fluid varies with the square of the electric field.

Because electrophoretic fluids operate in a substantially different manner from electrorheological fluids in the presence of an electric field, their use in existing electrorheological fluid clutches and other devices may not be functional. In addition a viscous drag is provided by the fluid in suspension when no power is applied. At the same time the coupling forces which may be achieved can be relatively low.

In the present invention it has been found advantageous to utilize a magnetorheological fluid for selectively coupling related members. Patents relating to magnetorheological fluids include U.S. Pat. No. 2,996,162 issued Aug. 15, 1961 to Lehde, U.S. Pat. No. 3,250,341 issued May 10, 1966 to Takahashi, U.S. Pat. No. 3,439,787 issued Apr. 22, 1969 to Minciotti et al and U.S. Pat. No. 4,664,236 issued May 12, 1987 to Stangroom.

With use of a magnetorheological fluid, a magnetic field is utilized which can be controlled by a electromagnetically generated magnetic field. The magnetic field can be generated with a relatively low voltage in response to which the yield strength in shear of the fluid will vary, i.e. increase with increases in the intensity of the magnetic field. At the same time in order to provide a high yield strength in shear the magnetorheological fluid utilized may exhibit a relatively high viscous drag characteristic in the non-energized state, i.e. when the magnetic field is removed. In this regard, however, the unique design of the present invention provides a structure in which the viscous drag during non-energization is minimized while the response to the application and variation in intensity of the magnetic field is optimized.

It is therefore an object of the present invention to provide a unique and improved fluid coupling apparatus which utilizes a magnetorheological fluid.

It is another object of the present invention to provide a fluid coupling apparatus having a unique design including a rotating member having a structure with a minimum moment of inertia whereby the response of the apparatus to variations in the strength of the magnetic field will be optimized.

It is still another object of the present invention to utilize a magnetorheological fluid having a predetermined high level of yield in shear when energized and at the same time to provide a coupling design in which the effects of viscous drag from the fluid, when not energized, will be minimized.

In the application of these and other objects, a torque transmission and conversion apparatus is provided utilizing a magnetorheological fluid which is controlled by the application of a magnetic field. The apparatus may be configured as a clutch, brake, differential or other torque coupling assembly and includes cooperating members which can be connected as drive and driven or reaction elements. The magnetorheological fluid operates in surface contact with the members for providing selective coupling therebetween.

In one form of the invention, the fluid coupling device is advantageously utilized in a torque load simulator system whereby the resistance to applied torque by a torque tool can be varied by varying the intensity of the magnetic field on the magnetorheological fluid to simulate the load encountered in driving a fastener in a particular application. With such a system the functioning of torque tools can be periodically monitored for performance and maintenance purposes. In addition the joint simulator system can be utilized for endurance testing of a torque tool to determine its suitability for a particular application and/or to assist in the general design and evaluation of a torque tool.

As will be seen, the joint simulator system of the present invention provides considerable advantages over existing simulator systems which are generally mechanically controlled. For example, with existing mechanical systems the torque on a joint is simulated by threading a member down against a preselected resistance; when this is completed the fastening mechanism must be released from the tool and the threaded structure reversed or unthreaded back to its original position. This can be a relatively time consuming process. In the present invention, the joint simulator can be quickly returned to its initial, no load condition by simply removing the excitation current generating the magnetic coupling field. This can be achieved without the necessity of removing the tool and is especially advantageous where an endurance test is being conducted requiring numerous repetitive load cycles.

Thus it is another object of the present invention to provide a unique fluid coupling device utilizing a magnetorheological fluid in a torque load simulator system whereby the performance of torque tools can be tested and/or evaluated under selectively variable load conditions.

Other objects, features and advantages of the present invention will become apparent from the subsequent description and the appended claims, taken in conjunction with the accompanying drawings, in which:

DESCRIPTION OF EMBODIMENTS OF THE INVENTION

As will be seen the fluid coupling device of the present invention allows for the controlled transmission and/or conversion of torque and thus may be used for a wide variety of applications such as, for example, a clutch, brake, locking or disengagement device, fastening systems and the like. In one form of the present invention the fluid coupling device is utilized as a part of a torque load simulator system. In the discussion which follows the term "magnetorheological fluid" shall, from time to time, be referred to as "MR fluid" and it should be understood that the meaning of both terms is the same.

Figure 1:
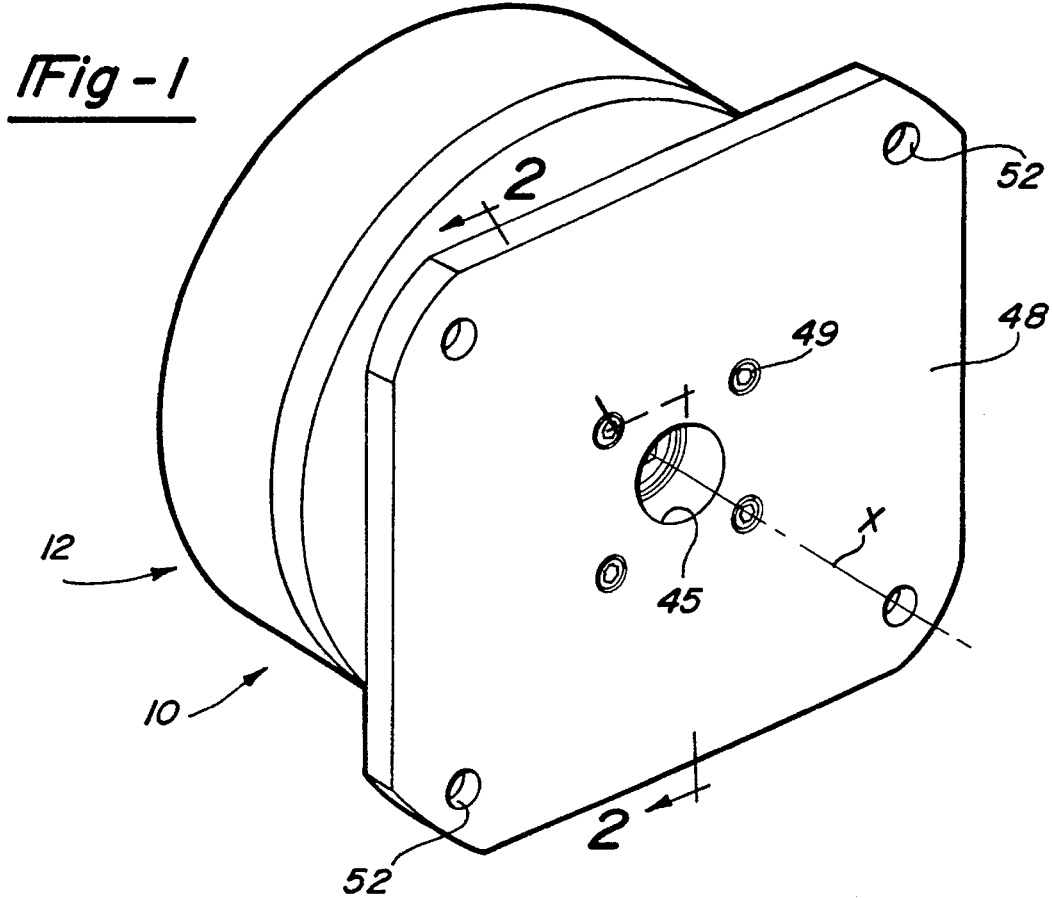
FIG. 1 is a pictorial front view of a fluid coupling device of the present invention.
Figure 3:
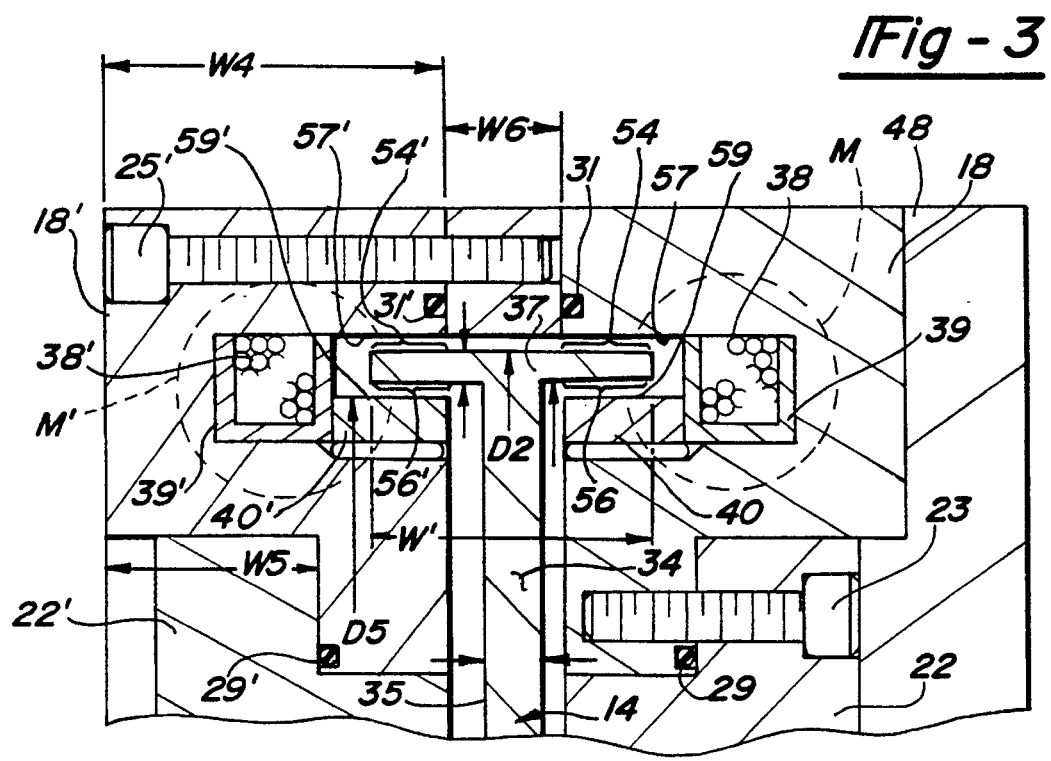
FIG. 3 is an enlarged sectional view of the portion of the coupling device of FIG. 2 taken generally in the Area 3.
Figure 2:
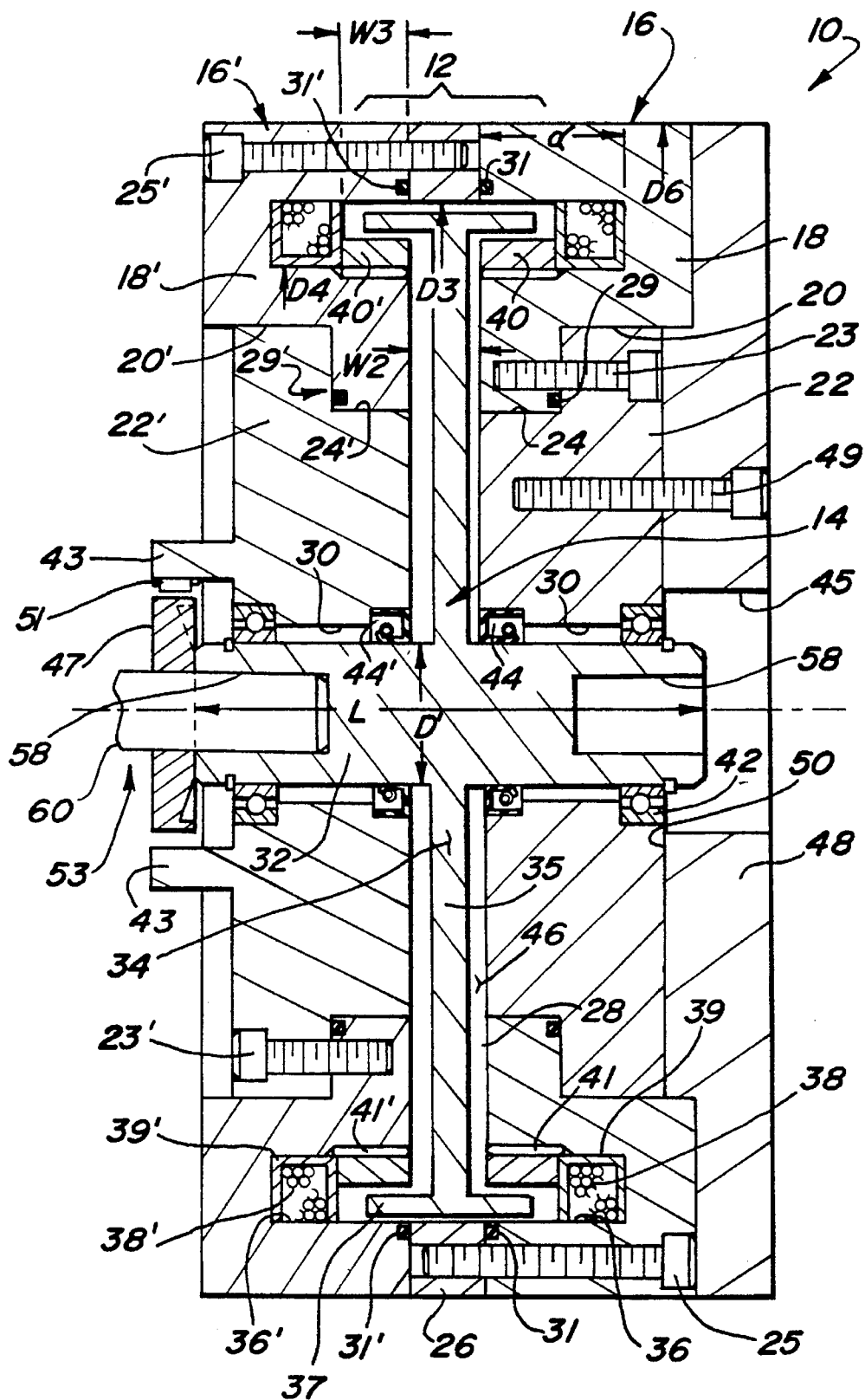
FIG. 2 is a sectional view of the coupling device of FIG. 1 taken generally along the lines 2—2 in FIG. 1.

Looking now to FIGS. 1–3 of the drawings, a fluid coupling device 10 is shown. The coupling device 10 includes a cylindrical housing assembly 12 and an inner rotor member 14. The housing assembly 12 includes two substantially identical front and back housing sections 16, 16', respectively. Each section 16, 16' includes a radially outer annular magnetic exciter plate 18, 18' having a radially stepped bore or opening 20, 20'. A pair of radially inner annular center, magnetically insulating plates 22, 22' have radially stepped outer surfaces 24, 24' which are matingly received within the associated one of the openings 20, 20' with a close tolerance fit.

A spacer ring 26 separates and magnetically insulates the housing sections 16, 16' to define a cavity 28. Each of the center plates 22, 22' of the sections 16, 16' has a central bore 30, 30' which bores are coaxial with each other and define an opening through the housing assembly 12 in communication with the cavity 28.

The exciter plates 18, 18' and center plates 22, 22' can be secured together by threaded bolts 23, 23' while the assembled housing sections 16, 16' can be secured to the spacer ring 26 and hence to each other by a plurality of circumferentially spaced threaded bolts 25, 25' The mating surfaces can be sealed by O-ring seals 29, 29' and 31, 31' which can be of a known, conventional construction.

The rotor member 14 has a central support or load shaft 32 and a plate portion 34 being generally T-shaped in cross-section from its radially inner end to its radially outer end. The T-shaped plate portion 34 has a generally planar center part 35 and a radially outer, continuous annular coupling ring 37. The exciter plates 18, 18' of housing sections 16, 16' have annular grooves 36, 36' adapted to receive annularly wound excitation coils 38, 38' which are supported in annular U-sectioned bobbins 39, 39'. Retainer rings 40, 40' are located in grooves 36, 36' and are approximately one half of the radial width of the grooves 36, 36' and serve to axially abut the bobbins 39, 39' to axially retain the coils 38, 38' in the grooves 36, 36'. Thus the radially outer portions of the grooves 36, 36' are open and hence are adapted to receive the axially outer ends of the coupling ring 37 of the T-shaped plate portion 34 with a preselected clearance or gap. The excitation coils 38, 38' can be constructed of a copper wire or other electrical conductor which is wound onto the bobbins 39, 39'. The copper wire can be polythermalized or otherwise provided with an insulating coating to prevent short circuiting or current leakage. A clear epoxy coating can be applied to the exterior of the coils 38, 38' to provide a surface which is substantially impervious to the MR fluid whereby the coils 38, 38' will be shielded from engagement by the MR fluid. A plurality of circumferentially disposed, radially aligned axial slots on the radially inner engaging surfaces of the retainer rings 40, 40' and annular groove 36, 36' are adapted to receive pins 41, 41' whereby relative rotation between these components is inhibited. In addition the retainer rings 40, 40' can be axially secured in the grooves 36, 36' via a plurality of threaded fasteners (not shown) extending axially into the exciter plates 18, 18' with an enlarged head engaging the retainer rings 40, 40'. Other locking means, such as chemical adhesives used to secure bearings, could be used.

The rotor member 14 is rotatably supported within the cavity 28 through the integral support shaft 32 by a pair of sealed bearings 42, 42' located in counterbores in bores 30, 30' at opposite outer ends of the center plates 22, 22'. The bores 30, 30' are additionally sealed at their axially inner ends by seals 44, 44' located in counterbores at the confronting inner ends of the bores 30, 30'. The sealed bearings 42, 42' are of a ball bearing type and can be of a known, conventional construction. Similarly, the seals 44, 44' similarly can be of a known, conventional construction. The surfaces of the support shaft 32 engaged by the seals 44, 44' are provided with a relatively smooth finish to enhance the effectiveness of the seal. The surfaces can have a 55 RC hardness with an 8 micro rms finish and are provided to be concentric within around 0.001 inches.

Thus the cavity 28 is of a T-shaped cross-section which is similar to that of the T-shaped plate portion 34. A flat, generally rectangular mounting or base plate 48 is secured to the outer end of the front housing section 16 by a plurality of bolts 49. As can be seen, the center plates 22, 22' are slightly recessed within the stepped bores 20, 20'. At the same time the mounting or base plate 48 has a circular boss 50 adapted to snugly fit within the recessed portion. The center plate 22' is provided with a pair of rectangularly shaped axially extending tabs 43 which are adapted to support a pickup member 51 of an angle position transducer 53. Transducer 53 includes a signal plate 47 supported on the support or load shaft 32 which cooperates with the pickup member 51 whereby a plurality of pulses or signals can be generated indicative of the angular rotation of the shaft 32 and hence of the rotor 14. The angle transducer 53 with pickup member 51 and signal plate 47 can be of a type known in the art.

A bore 45 in mounting or base plate 48 is co-axial with the bores 30, 30'. Mounting holes 52 are provided to facilitate securing the coupling device 10 to a desired structure. When assembled as shown, a magnetorheological fluid 46 is enclosed within the cavity 28 and can be located therein via suitable inlet and outlet ports (not shown). In operation the annular excitation coils 38, 38', when electrically energized, generate lines of magnetic flux into the MR fluid 46 in the small clearance between confronting surfaces in the cavity 28.

The clearance between the plate portion 34 and the confronting surfaces defining the cavity 28 is selected such that without magnetic flux through the magnetic fluid 46 in the cavity 28, the rotor member 14 is substantially free to rotate relative to the housing assembly 12 except for the resistance resulting from the inherent viscosity of the magnetic fluid 46. However, as direct current is supplied to the coils 38, 38', the shear yield strength of the MR fluid 46 increases and causes the driving torque transmitted by the rotor member 14 to be resisted. The magnitude of torque between the rotor member 14 and the housing assembly 12 as transmitted through the load or support shaft 32 under magnetically energized conditions varies directly relative to the strength of the magnetic field and hence to the magnitude of exciting current in coils 38, 38'.

In the embodiment of FIGS. 1–3, the T-shaped construction is advantageously utilized to concentrate the effect of the MR fluid to the applied field at the coupling ring 37 of the T-shaped plate portion 34. In addition the materials of the housing assembly 12, the retainer rings 40, 40' and the rotor member 14 are selected to direct the flux concentration at that location. At the same time the clearance between the coupling ring 37 and the adjacent surfaces of the grooves 36, 36' including the retainer rings 40, 40' is at a minimum and is substantially less than the clearance between the planar center part 35 and the adjacent surfaces of the exciter plates 18, 18'.

Thus in the form of the invention as shown in FIGS. 1–3, the rotor member 14; exciter plates 18, 18', and retainer rings 40, 40' were constructed of a material having a high permeability and low magnetic retentivity while the center, insulation plates 22, 22', the spacer ring 26 and the mounting plate 48 were constructed of a material having a low permeability. In one form, a 1018 steel was utilized for the high permeability material while a 6061-T6 aluminum was used for the low permeability material. In this manner the magnetic flux generated by the excitation coils 38, 38' will be concentrated at the radially outer end of the cavity 28 and hence in the grooves 36, 36' and in the volume surrounding the outer coupling ring 37 of the T-shaped plate portion 34. The bobbins 39, 39' are located in the annular grooves 36, 36' in a close tolerance fit to inhibit exposure of the coils 38, 38' to the MR fluid and are also constructed of 6061-T6 aluminum to provide additional shielding of the coils 38, 38' from contact with the MR fluid.

The response of the rotor member 14 to the excitation of the magnetic fluid may be enhanced by increasing the effective surface area of the coupling ring 37 and the confronting surfaces of the grooves 36, 36' and of the retainer rings 40, 40'. Thus the radially outer and radially inner surfaces, 54, 56, respectively, of the coupling ring 37 are knurled at least over the axially end portions which are in confrontation with the adjacent surfaces of the grooves 36, 36' and of the retainer rings 40, 40' (see FIG. 3). At the same time the confronting surfaces 57, 57' of the grooves 36, 36' and the radially outer surfaces 59, 59' of the retainer rings 40, 40' are similarly knurled. Since the aluminum spacer ring 26 is essentially a magnetic insulator, the magnetic paths M, M' of the fields generated by coils 38, 38' will be concentrated mainly in these adjacent, confronting surfaces which are directly in the magnetic flux paths M, M' (see FIG. 3).

In order to maximize the response time of the coupling device 10 to changes in magnitude of the magnetic field applied by the coils 38, 38', it is desirable that the rotor member 14 have a low moment of inertia. At the same time, however, it is desirable that the magnetically induced reaction forces be concentrated at a sufficient distance from the axis of rotation X whereby its effectiveness is increased. In addition, it is also desirable that the viscous drag under non-energized conditions be minimized. These objectives are met by the rotor member 14 with the T-shaped structure of the plate portion 34. The planar center part 35 is provided to be of a minimal thickness t1 and hence of minimal mass and moment of inertia. At the same time the overall cross section is minimized whereby viscous drag under non-energized conditions is minimized. The coupling ring 37 is provided to be of even a lesser thickness t2 and hence of a minimal mass and moment of inertia. In addition the coupling ring 37 of the T-shaped construction provides stiffness and/or rigidity to the relatively thin planar center part 35.

In one form of the invention, the support or load shaft 32 had a diameter D1 of around 0.875 inches and an overall length L of around 3.125 inches. The T-shaped plate portion 34 had an outer diameter D2 of around 6.20 inches while the coupling ring 37 had an axial width W1 of around 1.05 inches with the radial thickness t2 being around 0.100 inches (see FIG. 2). The inside diameter D3 of coupling ring 37 was around 6.00 inches. The thickness t1 of center part 35 was around 0.200 inches. The cavity 28 had a diameter D3 of around 6.275 inches and a width W2 of around 0.425 inches. The grooves 36, 36' had the same outside diameter D3 of cavity 28, around 6.275 inches, an inside diameter D4 of around 5.480 inches and an axial depth d, of around 0.885 inches. The retainer rings 40, 40' had an outer diameter D5 of around 5.921 inches and an axial width W3 of around 0.425 inches. The outside diameter D6 of the outer, exciter plates 18, 18' and spacer ring 26 was around 7.279 inches while the axial width W4 of the exciter plates 18, 18' was around 1.30 inches and the axial width W5 of the stepped opening 20 was around 0.80 inches. The axial width W6 of the spacer ring 26 was around 0.450 inches whereby the opposite axial end portions of coupling ring 37 will extend axially into the grooves 36, 36' by around 0.300 inches. In the above construction the knurl on the surfaces 54, 56 of coupling ring 37 and on the confronting surfaces 57, 57' and 59, 59' was a straight knurl with twelve teeth per inch. Thus it can be seen that the radial clearance or gap between the surfaces 54 and 56 on the end portions of the coupling ring 37 and the confronting radial surfaces 57, 57' of the grooves 36, 36' and radial surfaces 59, 59' of the retainer rings 40, 40' was around 0.375 inches. At the same time the axial clearance between the center part 35 and the adjacent axial surfaces of the outer plates 18, 18' and center insulation plates 22, 22' was around 0.109 inches. Thus the clearance at the center part 35 was at least around three times the clearance at the coupling ring 37 and specifically the clearance at the surfaces 54 and 56 or, in other words, the clearance at the coupling ring 37 was no greater than around 30% of that of the center part 35. At the same time it is believed that the radial spacing of the end portions of the coupling ring 37 from the noted confronting surfaces being generally no greater than around 0.0375 inches provides a desirable level of magnetic coupling. At the same time the spacing was great enough such that the viscous drag under non energized conditions was generally not significantly increased over that encountered were a larger clearance space provided.

Thus with this construction the magnetic flux generated by the coils 38, 38' will be concentrated in the low reluctance paths M, M' through the surfaces 54, 56 of coupling ring 37 and the confronting surfaces 57, 57' and 59, 59'

Magnetorheological fluids, such as fluid 46, exhibit a characteristic of having a yield strength in shear which increases as a function of increasing strength of the applied magnetic field until a peak is reached at which point further increases in the magnetic field will have diminishing returns on shear strength. Another consideration is the factor of saturation of the materials in the magnetic circuit or path at determinable levels of magnetic flux density. In order to maximize the torque load carrying capacity of the coupling device 10 while maintaining a compact structure, it is desirable to provide an MR fluid 46 having a high yield strength in shear at its peak. In the present invention for the coupling device 10, constructed as previously described, an MR fluid 46 having a peak yield strength in shear of at least around 120 Kilo Pascals was selected. At the same time, however, the magnetic fluid will exhibit a relatively high level of viscosity when not magnetically energized. As noted, however, the effects of the relatively high viscosity when non-energized is compensated by the unique design of the rotor member 14 and of the associated members defining the cavity 28. A magnetic fluid having this desired characteristic was one sold by the Lord Corporation under the designation of MRX-150 AC. With a construction generally as shown and described the rotor member 14 could be locked from rotation at a maximum input torque of around 100 foot pounds with a maximum d.c. current of 5 amps applied to each of the coils 38, 38'. At this level of excitation the MR fluid 46 was generally at its peak yield strength in shear.

The cooperating T-shaped constructions of the rotor member 14 and of the cavity 28 provide for a mechanically and magnetically balanced design. Thus the T-shaped constructions facilitate the use of symmetrical components of the two housing sections 16, 16'. It is also believed that the use of a pair of identically, oppositely placed excitation coils 38, 38' facilitates a compact structure while optimizing the magnetic coupling effect.

Figure 4:
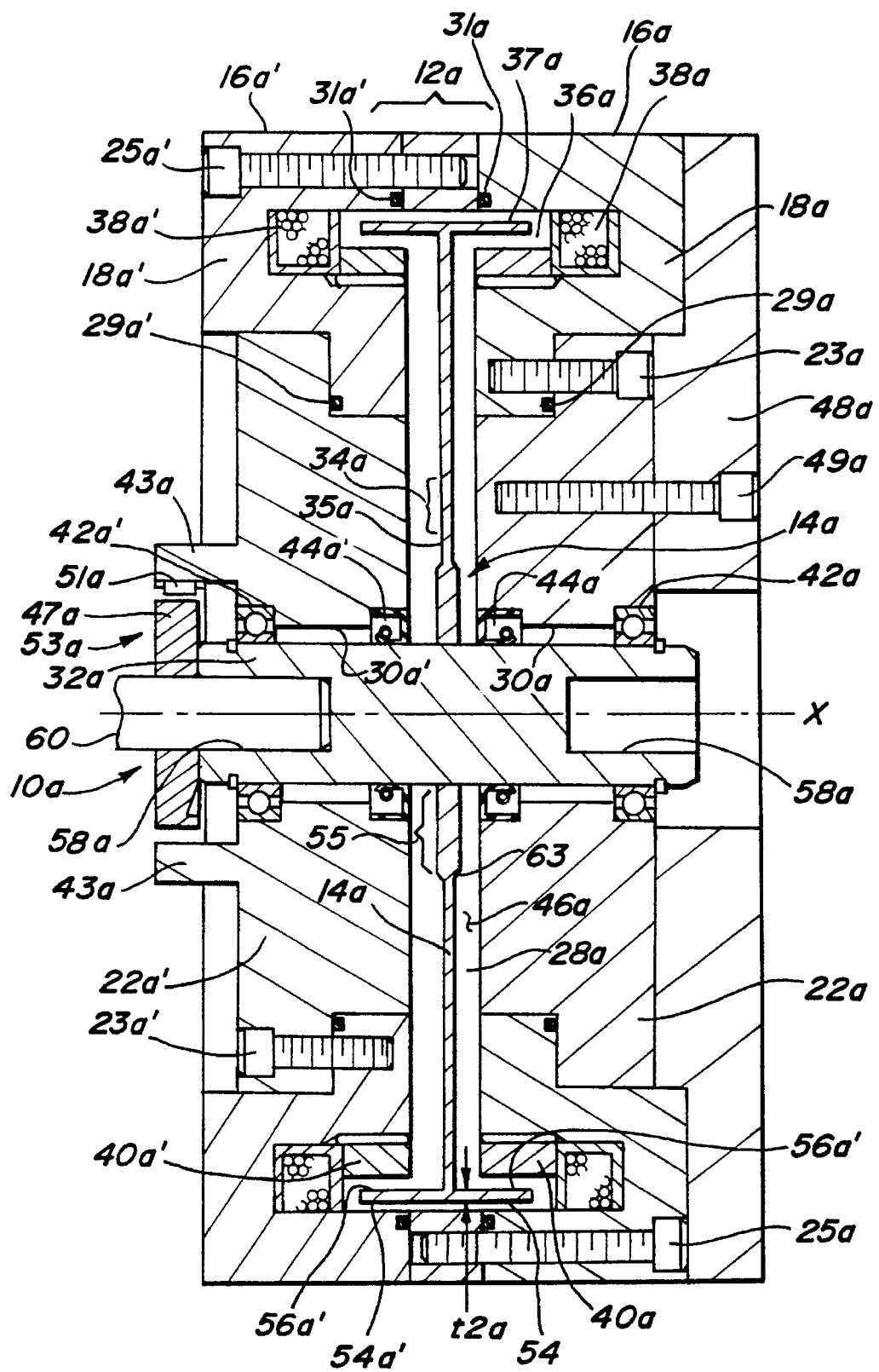
FIG. 4 is a sectional view of a modified form of rotor member for use in the fluid coupling device of FIGS. 1–3.
Figure 5:
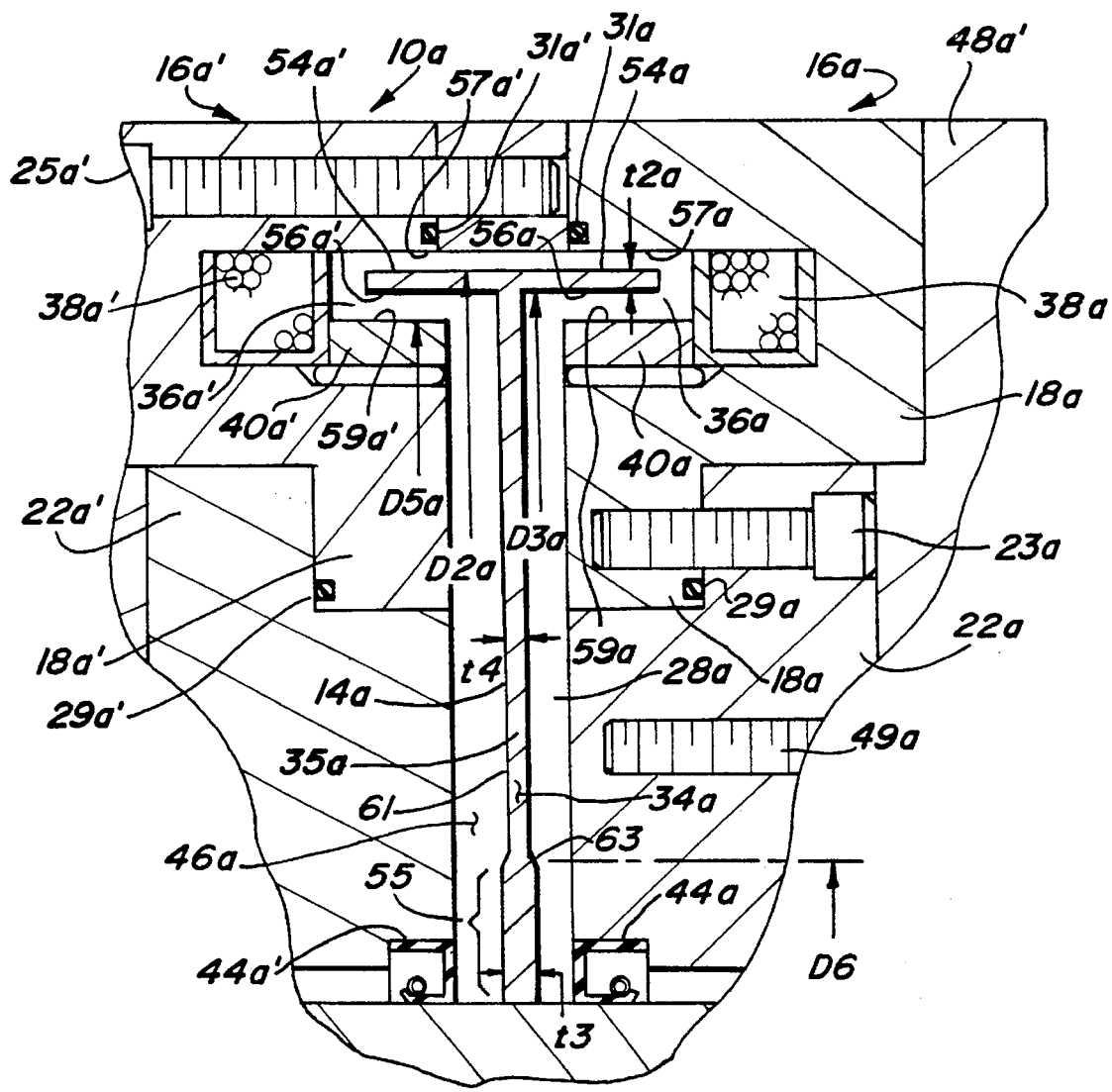
FIG. 5 is an enlarged sectional view of the portion of the coupling device of FIG. 4 taken generally in the Area 5.

A modified form of the rotor member is shown in FIGS. 4 and 5 in which the configuration and weight have been optimized to further reduce the moment of inertia and increase response time and also to further reduce viscous drag under non-energized conditions. In the description of the embodiment of FIGS. 4 and 5 components similar to like components in the embodiment of FIGS. 1–3 are given the same numeral designations with the addition of the letter postscript "a".

Looking now to FIGS. 4 and 5, the rotor member 14a of the coupling device 10a has a central support or load shaft 32a and a separate generally T-shaped plate member 34a including a generally planar center part 35a and a radially outer coupling ring 37a.

The design and materials of the components of the fluid coupling device 10a are similar to that of coupling device 10. Thus unless described otherwise the similarly numbered components of coupling devices 10 and 10a can be considered to be essentially the same and hence their description shall not be repeated for purposes of simplicity. Here the separate T-shaped member 34a of the rotor member 14a was constructed of a material having a high permeability and low magnetic retentivity which in the embodiment shown was a 1018 steel. As noted, however, the support shaft 32a is separate from the T-shaped member 34a and in the embodiment of FIGS. 4 and 5 could be made of a high strength stainless steel such as 17-4PH. The higher strength corrosion resistant material will provide additional strength and wear and corrosion resistance to the support shaft 32a. The permeability of the stainless steel support shaft 32a, however, will be considerably lower than that of the other steel members. With this construction of the rotor member 14a, the concentration of magnetic flux generated by the associated excitation coils 38a, 38a' will be further assisted to be concentrated at the radially outer end of the cavity 28a in the housing assembly 12a and hence in the volume surrounding the outer ring part 37a of the T-shaped plate member 34a. At the same time fewer magnetic particles will be attracted to the vicinity of the associated bearings 42a, 42a' and seals 44a, 44a' whereby seal and bearing life can be improved. The separate T-shaped member 34a can be secured to the support shaft 32a by a keyed, splined or other connecting structure including retaining rings and the like.

As with the embodiment of FIGS. 1–3, the radially outer and radially inner surfaces, 54a, 56a, respectively, of the coupling ring 37a are knurled to enhance the effective surface area. As will be seen the design of rotor member 14a provides a further reduction in the already low moment of inertia of rotor member 14 while at the same time having the magnetically induced reaction forces concentrated at a sufficient distance from the axis of rotation X whereby its effectiveness is increased.

In the embodiment of FIGS. 4 and 5, the overall size of the T-shaped plate member 34a is essentially the same as that of T-shaped plate portion 34 except for the relative thicknesses or widths of the center parts 35 and 35a and coupling rings 37 and 37a. The dimension of the support shafts 32 and 32a are the same. Thus the coupling ring 37a is provided with a radial thickness t2a of around 0.050 inches, i.e. around one half of the thickness t2 of coupling ring 37. The center part 35a is made with a stepped construction having a radially inner portion 55 with a thickness t3 of around 0.100 inches and a radially outer portion 61 with a reduced thickness t4 of around 0.050 inches. (See FIG. 5). A relatively smooth transition portion 63 is provided by a 45° transition angle between the inner portion 55 and outer portion 61. Thus the center part 35a was provided with a greater width or thickness t3 at the connection with the load or support shaft 32a where the highest stresses will be encountered. At the same time, however, the overall weight and moment of inertia of the rotor member 14a has been reduced and essentially minimized. The above reductions in thickness provide additional streamlining which should result in reduction in viscous drag under non-energized conditions. In this regard the outside diameter D2a of the coupling ring 37a was maintained at 6.200 inches while the inside diameter D3a was increased to 6.100 inches as a result of the reduction of thickness t2a. The radial gap of 0.0375 inches, between confronting surfaces within the grooves 36a, 36a' was maintained the same, however, by increasing the outside diameter D5a of the retainer rings 40a, 40a' to 6.021 inches. At the same time, the outside diameter D6 of the radially inner portion 55 was around 1.875 inches or less than around 30% of the inside diameter D3a of the coupling ring 37a.

In this regard, the axial space or gap between the thinner outer portion 61 and the confronting surfaces of the exciter plates 18a, 18a' is further increased to 0.134 inches which further promotes the concentration of magnetic flux radially outwardly at the coupling ring 37a. It should be understood that while the rotor member 14a of the coupling device 10a depicts the use of a load shaft 32a being a separate member from the T-shaped plate member 34a, a one piece construction, such as with rotor member 14, could be utilized with the T-shaped plate portion formed to the dimensions of the separate plate member 34a.

As with the coupling device 10, the coupling device 10a includes an angle position transducer 53a, including a signal plate 47a and pickup member 51a for providing angular position information of the rotor member 14a.

Figure 6:
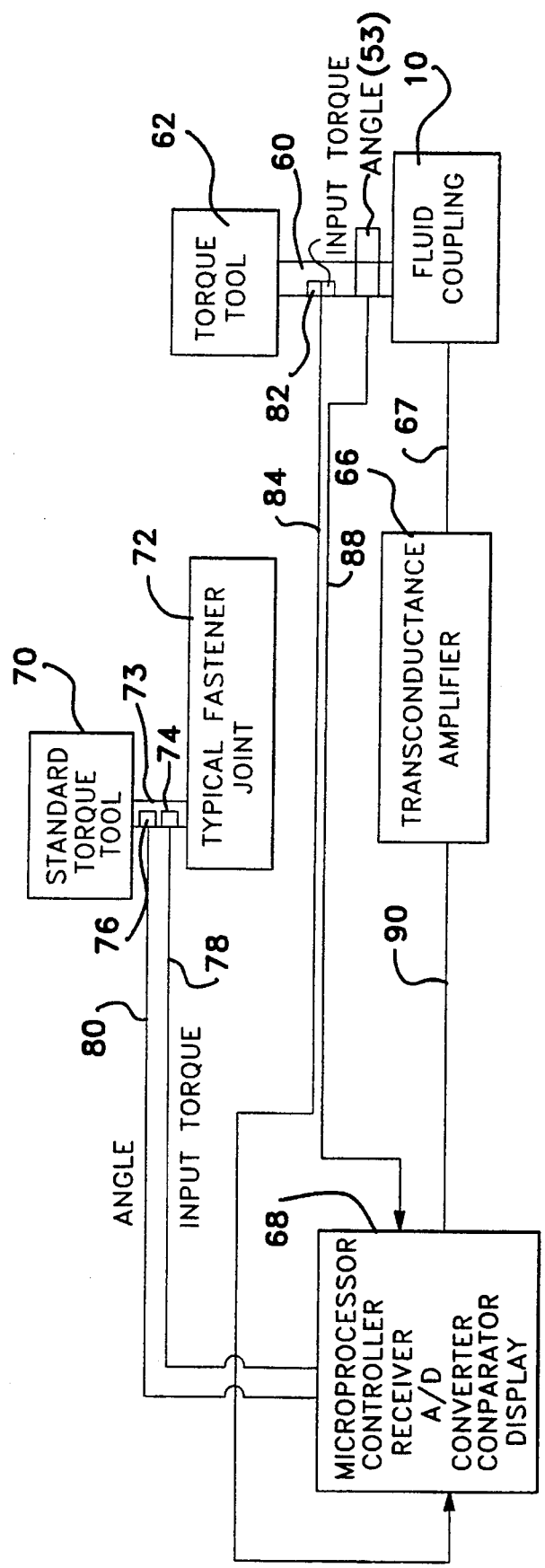
FIG. 6 is a schematic diagram of a torque load simulator system utilizing the fluid coupling device of FIGS. 1–3 or FIGS. 4 and 5.

The fluid coupling devices 10, 10a can be especially useful for a torque load simulator system for evaluating torque tools utilized for installing threaded fasteners. In many applications of threaded fasteners it is desirable to quickly run the fastener down until the workpieces to be secured are initially clamped together. This can be done under relatively low levels of applied torque and with the tool rotating quite rapidly. With the workpieces initially clamped together the torque load on the fastener is increased as the resistance to turning increases. A particular torque tool in installing a fastener or threaded member will thus generate a torque output curve relative to the angle of rotation and/or to time. Thus an ideal or operationally acceptable torque curve can be determined for such installation. This data can then be used to control a fluid coupling device such as coupling device 10 (10a) to simulate the torque load on a fastener whereby the performance of a torque tool can be evaluated by measuring its output torque and response relative to the controlled load variations. Thus by selectively controlling the excitation current to the coils 38, 38' and hence the magnitude of the magnetic field applied to the MR fluid 46 the torque reaction load experienced by an installation tool in installing a fastener or threaded member can be simulated. FIG. 6 is a block diagram of a torque load simulator system utilizing the fluid coupling device 10 to provide such simulated reaction loads.

Looking first to FIGS. 2 and 3, the support shaft 32 has square openings 58 at opposite ends. The square openings 58 can be of a standard size to accept a similarly shaped male end of an output shaft of a torque tool such as output shaft 60 of a torque tool 62. The torque tool 62 can be of a conventional construction powered pneumatically, hydraulically or electrically with an output torque capability of the desired magnitude. The signal plate 47 can be adapted to be mounted on the mating, square shaped portion of the output shaft 60 or otherwise separately secured to the support shaft 32.

An electrical power supply such as transconductance amplifier 66 provides the necessary, controlled d.c. voltage in order to transmit the desired magnitude of d.c. current to the excitation coils 38, 38' via a line 67. A microprocessor-controller 68 is connected to the power supply or amplifier 66 and is adapted to control the amplifier, power supply 66 to provide a preselected variation in magnitude of current to the coils 38, 38' whereby the magnetic coupling between the rotor member 14 and the fixed housing assembly 12 will be varied. The controller 68 can be operated manually or programmed to operate automatically to vary the control signal to the amplifier 66 pursuant to a known torque curve to provide the desired variations in magnetic coupling by the fluid coupling 10 (10a) and hence the desired load simulation to the torque tool 62.

The desired torque curve for a particular fastener application can be secured by utilizing a torque tool standard 70 to install a threaded fastener in a typical fastener joint 72. The output shaft 73 of the tool standard 70 will be provided with a torque sensing transducer 74 and an angle sensing transducer 76 similar to angle transducers 53, 53a. The torque sensing transducer 74 can be of a well known strain gauge type. Similarly the angle transducer 76 can be of a type known in the art. The microprocessor-controller 68 can employ a computer of a conventional construction such as an IBM PC. Thus as the torque tool standard 70 installs the typical fastener joint 72 the magnitude of applied input torque and angle of rotation of the output shaft 73 will be transmitted to the microprocessor-controller 68 via lines 78 and 80, respectively. This data will be transmitted in analog form and converted to digital via an A/D converter in the microprocessor-controller 68 and stored in memory. It should be understood that the torque and angle data generated by the torque tool standard 70 and typical fastener joint 72 can be obtained and recorded at a remote location and the recorded information later loaded into the microprocessor-controller 68.

In evaluating the performance of the torque tool 62 the magnitude of torque applied at the output shaft 60 can be measured by a typical torque transducer 82 and this torque signal can be transmitted to the microprocessor-controller 68 via line 84. The angle of rotation of the output shaft 60 can be measured by an angle transducer 53 connected to the support or load shaft 32 and transmitted to the microprocessor-controller 68 via line 88. Again these torque and angle analog signals will be digitized for use by the microprocessor-controller 68.

Thus in operation, the microprocessor-controller 68 will first be provided with the data for the torque load curve from the torque tool standard 70 and typical fastener joint 72. With this information stored the torque tool 62 will then have its output shaft 60 drivingly connected to the support or load shaft 32 of the fluid coupling device 10 (10a). Upon actuation of the torque tool 62 the microprocessor-controller 68 will be activated to provide control signals to the amplifier 66 via line 90 having variations in magnitude in accordance with the known magnitudes of torque and angle from the torque tool standard 70. The amplifier 66 will then provide the corresponding magnitude of energizing current to the coils 38, 38' via line 67 to generate the necessary varying magnitudes of magnetic field to imulate the reaction loads encountered by the torque tool standard 70 in setting the typical fastener joint 72. The performance of the torque tool 62 can then be measured, recorded and compared to the desired or standard performance as determined for that type of tool and that type of fastener installation. The comparison can be provided visually on a screen and/or in a printed, recorded form by the microprocessor-controller 68.

It should be noted that the magnitude of magnetic coupling between the rotor member 14 and the associated members of the housing assembly 12 and hence of the resistance to applied torque therebetween is not a linear function relative to the magnitude of the applied magnetic field. For example, where a rapid rise in simulated load is required, the necessary rapid rise in magnitude of current to provide the necessary magnetic field strength may be resisted during the rise time by the inductive reactance of the coils 38, 38'. In this case the microprocessor-controller 68 can be programmed to provide a higher initial d.c. voltage to compensate for the time required to respond to the transient effect of the inductive reactance. This relationship, however, can be determined in calibration of the coupling device 10 and such data can be loaded and stored in the microprocessor-controller 68. In this regard, the construction of the couplings 10, 10a utilizing a pair of coils 38, 38' instead of one coil of increased turns for the same overall magnetic field may assist in minimizing the effects of the inductive reactance to rapid changes in excitation current. The magnitude of energizing current from the amplifier 66 to the energizing coils 38, 38' will then be programmed to be automatically varied to compensate for non-linearity whereby the generated magnetic field and resultant coupling will be varied to provide the desired loading to relative rotation and hence to the applied torque. Because of the unique structure noted including minimization of the moment of inertia, viscous drag and the like the response time and accuracy of the fluid coupling device 10 (10a) will be enhanced and optimized. These features can be further enhanced by use of the coupling device 10a with its rotor member 14a and associated components.

In some instances the application of variations in a simulated load relative to a time base could be utilized in combination with or in lieu of angular position. In this regard, it may be desirable in some instances to first run the tool 62 to be tested under a selected load for a determinable time interval to simulate warm up before the main simulated load curve is applied. Still in other instances it may be desirable to begin the application of simulated load after the torque tool 62 has first attained a predetermined threshold of torque load. These operative functions can all be selectively accomplished with routine programming of the microprocessor-controller 68.

In addition to utilizing the fluid coupling device 10 to provide performance and/or maintenance checks on tools such as torque tool 62, the coupling device 10 (10*a*) can also be advantageously used for performing other tests such as endurance tests, life tests, wear tests and the like on such tools and/or components associated with such tools. In the latter instance, repetitive loading of a torque tool 62 could be performed following a single preselected torque-angle load curve or a number of different torque-angle curves could be sequentially utilized. In this case, depending upon the joint application being simulated, the torque tool 62, when cycled, could be automatically turned on and off with each cycle or it could be maintained on in a no-load condition at the end of each cycle. Likewise at the end of each load cycle the transconductance amplifier 66 could be controlled to a low or zero voltage condition whereby the excitation current to the coils 38, 38' would be interrupted or reduced to a desired low magnitude for the initiation of a new load cycle. Regardless, however, such load cycles can be accomplished rapidly and repetitively. Thus, as noted, the rapid response of the joint simulator system of the present invention provides considerable advantages over existing mechanical systems in which the torque on a joint is simulated by threading a test member down against a preselected resistance and when this is completed releasing the tool and reversing or unthreading the test member.

It should also be understood that the system of FIG. 6 can be used for evaluation, test or development of a variety of different torque tools with a variety of torque and performance characteristics. In this regard, it should be noted that the load simulator system of FIG. 6 could also be used in the test and evaluation of other torque transmitting elements, such as, for example drive shafts and universal joints, which are subjected to varying magnitudes of applied torque, braking, and the like.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. A controllable magnetorheological fluid apparatus, said apparatus comprising at least two relatively spaced, magnetically permeable members, said members rotatably movable relative to each other, a magnetorheological fluid occupying a space between said members for transmitting torque between said members, said fluid providing an increase in yield strength in shear in response to increases in the magnitude of an applied magnetic field, and electromagnetic means for applying the magnetic field between said members and to said fluid for varying the magnitude of torque transmission between said members by said fluid in response to variations in the magnitude of the applied magnetic field, said members including a rotor member and a housing member, said housing member having a cavity with said rotor member being rotatably supported in said cavity, said space occupied by said fluid being generally defined in said cavity by the clearance between said rotor member and said housing member, said rotor member having a plate structure with a generally T-shaped cross-section, said cavity having a similarly T-shaped cross-section, said electromagnetic means applying the magnetic field into said space and between said plate structure and said housing member through said magnetorheological fluid, said clearance between said plate structure and said housing member selected to concentrate the magnetic field at the radially outer end of said T-shaped plate structure and said T-shaped cavity, said housing member having a first section at said radially outer end of said T-shaped cavity constructed of a material having a high magnetic permeability and having a second section at the radially inner end of said cavity constructed of a material having a low magnetic permeability, said electromagnetic means comprising coil means located in axially opposite annular grooves in said first section at said radially outer end of said cavity, said plate structure defined by an outer ring part and a generally at center part, the opposite axial ends of said ring part located partially within the confronting one of said annular grooves, the radial clearance between said outer ring part of said plate structure and said housing member at said radially outer end of said cavity being a minimum for substantially maximum magnetic coupling without substantially increasing the magnitude of viscous drag under non-actuated conditions and being no greater than around 30% of the axial clearance of said center part with said housing member.

2. The apparatus of claim 1 with said magnetorheological fluid in response to the magnetic field of a preselected maximum intensity having a maximum yield strength in shear of at least around 120 Kilo Pascals.

3. The apparatus of claim 1 with said rotor member including a support shaft for rotatably supporting said rotor member in said housing member, said support shaft being of a separate construction from said plate structure with said plate structure being secured to said support shaft for rotation therewith, said support shaft being made of a high strength corrosion resistant material having a magnetic permeability lower than that of said plate structure.

4. The apparatus of claim 1 with said rotor member including a support shaft for rotatably supporting said rotor member in said housing member, said flat center part being of a generally stepped construction and having a center portion adjacent said support shaft of a greater width or thickness than the outer portion of said flat center part leading to said outer ring part.

5. The apparatus of claim 1 with said opposite axial ends of said outer ring part having toughened surfaces for increasing the magnetic coupling with the radially confronting surfaces of said grooves.

6. The apparatus of claim 1 with said opposite axial ends of said outer ring part and the radially confronting surfaces of said grooves having co-operating roughened surfaces for increasing the magnetic coupling therebetween.

7. The apparatus of claim 1 with said opposite axial ends of said outer ring part and the radially confronting surfaces of said grooves being radially spaced no greater than around 0.0375 inches.

8. A controllable magnetorheological fluid apparatus, said apparatus comprising at least two relatively spaced, magnetically permeable members, said members rotatably movable relative to each other, a magnetorheological fluid occupying a space between said members for transmitting torque between said members, said fluid providing an increase in yield strength in shear in response to increases in the magnitude of an applied magnetic field, and electromagnetic means for applying the magnetic field between said members and to said fluid for varying the magnitude of torque transmission between said members by said fluid in response to variations in the magnitude of the applied magnetic field, said members including a rotor member and a housing member, said housing member having a cavity with said rotor member being rotatably supported in said cavity, said space occupied by said fluid being generally defined in said cavity by the clearance between said rotor member and said housing member, said rotor member having a plate structure with a generally T-shaped cross-section defined by a radially extending center part and an outer ring part located at the radially outer end of said center part and extending generally axially in opposite directions from said center part, said cavity having a similarly T-shaped cross-section, said electromagnetic means applying the magnetic field into said space and between said plate structure and said housing member through said magnetorheological fluid, said clearance between said plate structure and said housing member selected to concentrate the magnetic field at the radially outer end of said T-shaped plate structure and said T-shaped cavity the radial clearance between said outer ring part of said plate structure and said housing member at said radially outer end of said cavity being a minimum for substantially maximum magnetic coupling without substantially increasing the magnitude of viscous drag under non-actuated conditions.

9. The apparatus of claim 8 with said housing member having a first section at said radially outer end of said T-shaped cavity and on opposite axial sides of said plate structure constructed of a material having a high magnetic permeability and having a second section at the radially inner end of said cavity and on opposite axial sides of said plate structure constructed of a material having a low magnetic permeability.

10. The apparatus of claim 9 with said electromagnetic means comprising coil means located in axially opposite annular grooves in said first section at said radially outer end of said cavity, said plate structure having its radially outer end located partially within said annular grooves.

11. The apparatus of claim 9 with said center part being generally flat and the radial clearance between said outer ring part of said plate structure and said housing member at said radially outer end of said cavity being no greater than around 30% of the axially clearance of said center part with said housing member.

12. The apparatus of claim 10 with said magnetorheological fluid in response to the magnetic field of a preselected maximum intensity having a maximum yield strength in shear of at least around 120 Kilo Pascals.

13. The apparatus of claim 12 with said center plate being generally flat and the radial clearance between said outer ring part of said plate structure and said housing member at said radially outer end of said cavity being no greater than around 30% of the axially clearance of said center part with said housing member.

14. The apparatus of claim 11 with said rotor member including a support shaft for rotatably supporting said rotor member in said housing member, said support shaft being of a separate construction from said plate structure with said plate structure being secured to said support shaft for rotation therewith.

15. The apparatus of claim 14 with said support shaft being made of a high strength corrosion resistant material having a magnetic permeability lower than that of said plate structure.

16. A controllable magnetorheological fluid apparatus, said apparatus comprising at least two relatively spaced, magnetically permeable members, said members rotatably movable relative to each other, a magnetorheological fluid occupying a space between said members for transmitting torque between said members, said fluid providing an increase in yield strength in shear in response to increases in the magnitude of an applied magnetic field, and electromagnetic means for applying the magnetic field between said members and to said fluid for varying the magnitude of torque transmission between said members by said fluid in response to variations in the magnitude of the applied magnetic field, said members including a rotor member and a housing member, said housing member having a cavity with said rotor member being rotatably supported in said cavity, said space occupied by said fluid being generally defined in said cavity by the clearance between said rotor member and said housing member, said rotor member having a plate structure with a preselected cross-section, said cavity having a similarly shaped cross-section, said electromagnetic means applying the magnetic field into said space and between said plate structure and said housing member through said magnetorheological fluid, said clearance between said plate structure and said housing member selected to concentrate the magnetic field at the radially outer end of said plate structure and said cavity, said housing member having a first section at said radially outer end of said cavity constructed of a material having a high magnetic permeability and having a second section at the radially inner end of said cavity constructed of a material having a low magnetic permeability, said electromagnetic means comprising coil means located in at least one annular groove in said first section at said radially outer end of said cavity, said plate structure defined by an outer ring part and a generally flat center part, said outer ring part having at least one axially extending end located in said annular groove, the radial clearance between said outer ring part of said plate structure and the confronting surfaces of said annular groove being no greater than around 30% of the axial clearance of said center part with said housing member, said axial end of said ring part and the radially confronting surfaces of said groove being radially spaced no greater than around 0.0375 inches.

17. The apparatus of claim 16 with said magnetorheological fluid in response to the magnetic field of a preselected maximum intensity having a maximum yield strength in shear of at least around 120 Kilo Pascals.

18. The apparatus of claim 17 with said rotor member including a support shaft for rotatably supporting said rotor member in said housing member, said support shaft being of a separate construction from said plate structure with said plate structure being secured to said support shaft for rotation therewith, said support shaft being made of a high strength corrosion resistant material having a magnetic permeability lower than that of said plate structure.

19. A torque responsive fluid coupling for transmitting torque from a torque generating member comprising: a rotor member rotatably mounted in a closed cavity in a fixed housing and having an input end receiving input torque from the torque generating member, electromagnetic means including an exciting winding for coupling selectively varying magnitudes of torque from the torque generating member between said rotor member and said housing member in response to selectively varying increasing current flow through said exciting winding, an energizing circuit connected to said exciting winding; said electromagnetic means further comprising a magnetorheological fluid located in said cavity between said rotor member and confronting surfaces of said housing in said cavity for controlling the magnitude of relative torque between said rotor member and said housing, wherein said fluid provides an increase in yield strength in shear in response to a magnetic field having a strength of increasing magnitude when said field is applied between said members and said fluid, said magnitude of magnetic field strength varying in accordance with the magnitude of current to said exciting winding from said energizing circuit, said housing member having a pair of axially spaced first section members in general confrontation with each other at said radially outer end of said cavity constructed of a material having a high magnetic permeability, and having a pair of axially spaced second section members in general confrontation with each other at the radially inner end of said cavity constructed of a material having a low magnetic permeability, said electromagnetic means comprising coil means located in an annular groove in one of said first section members at said radially outer end of said cavity, said rotor member having a plate structure having its radially outer end extending axially partially within said annular groove.

20. The torque coupling of claim 19 with said electromagnetic means comprising coil means located in axially opposite annular grooves in each of said first section members at said radially outer end of said cavity, said plate structure having its radially outer end extending in opposite axial directions partially within each of said annular grooves.

21. A torque load simulator system for determining the performance of torque applying tools relative to a preselected standard, comprising:

a controllable magnetorheological fluid torque coupling apparatus, said apparatus comprising at least two relatively spaced, magnetically permeable members, said members rotatably movable relative to each other, a magnetorheological fluid occupying a space between said members for transmitting torque between said members, said fluid providing an increase in yield strength in shear in response to increases in the magnitude of an applied magnetic field, and electromagnetic means responsive to electrical excitation current for applying the magnetic field between said members and to said fluid for varying the magnitude of torque transmission between said members by said fluid in response to variations in the magnitude of the applied magnetic field, said members including a rotor member and a housing member, said housing member having a cavity with said rotor member being rotatably supported in said cavity, said space occupied by said fluid being generally defined in said cavity by the clearance between said rotor member and said housing member, said rotor member having a plate structure with a generally T-shaped cross-section defined by a radially extending center part and an outer ring part located at the radially outer end of said center part and extending generally axially in opposite directions from said center part, said cavity having a similarly T-shaped cross-section, said electromagnetic means applying the magnetic field into said space and between said plate structure and said housing member through said magnetorheological fluid, said clearance between said plate structure and said housing member selected to concentrate the magnetic field at the radially outer end of said T-shaped plate structure and said T-shaped cavity, electrical power means for providing the electrical excitation current to said electromagnetic means in response to control signals, controller means for providing said control signals to said electrical power means and being selectively controllable to provide predetermined variations in magnitude of the electrical current to provide related variations in the magnitude of said magnetic field and hence in the magnitude of the shear strength in yield of said fluid in a manner simulating desired installation torque load patterns by an acceptably operating torque tool, said rotor member having a support shaft rotatably supporting said rotor member with said housing member, said support shaft having an input end adapted to be connected to the output shaft of a torque tool to be tested, torque transducer means for measuring the magnitude of torque applied to said input end of said support shaft by the torque tool being tested and for providing a torque signal indicative of the magnitude of the applied torque to said support shaft, said controller means including a receiver member for receiving said torque signal from said torque transducer and to receive said control signals from said controller means indicative of the magnitude of electrical excitation current whereby an indication of the performance of the torque tool being tested can be measured.

22. A torque load simulator system for determining the performance of torque applying tools relative to a preselected standard, comprising:

a controllable magnetorheological fluid torque coupling apparatus, said apparatus comprising at least two relatively spaced, magnetically permeable members, said members rotatably movable relative to each other, a magnetorheological fluid occupying a space between said members for transmitting torque between said members, said fluid providing an increase in yield strength in shear in response to increases in the magnitude of an applied magnetic field, and electromagnetic means responsive to electrical excitation current for applying the magnetic field between said members and to said fluid for varying the magnitude of torque transmission between said members by said fluid in response to variations in the magnitude of the applied magnetic field, said members including a rotor member and a housing member, said housing member having a cavity with said rotor member being rotatably supported in said cavity, said space occupied by said fluid being generally defined in said cavity by the clearance between said rotor member and said housing member, said rotor member having a plate structure with a generally T-shaped cross-section, said cavity having a similarly T-shaped cross-section, said electromagnetic means applying the magnetic field into said space and between said plate structure and said housing member through said magnetorheological fluid, said clearance between said plate structure and said housing member selected to concentrate the magnetic field at the radially outer end of said T-shaped plate structure and said T-shaped cavity, electrical power means for providing the electrical excitation current to said electromagnetic means in response to control signals, controller means for providing said control signals to said electrical power means and being selectively controllable to provide predetermined variations in magnitude of the electrical current to provide related variations in the magnitude of said magnetic field and hence in the magnitude of the shear strength in yield of said fluid in a manner simulating desired installation torque load patterns by an acceptably operating torque tool, said rotor member having a support shaft rotatably supporting said rotor member with said housing member, said support shaft having an input end adapted to be connected to the output shaft of a torque tool to be tested, torque transducer means for measuring the magnitude of torque applied to said input end of said support shaft by the torque tool being tested and for providing a torque signal indicative of the magnitude of the applied torque to said support shaft, said controller means including a receiver member for receiving said torque signal from said torque transducer and to receive said control signals from said controller means indicative of the magnitude of electrical excitation current whereby an indication of the performance of the torque tool being tested can be measured, an angle transducer connected to said support shaft for providing an angle signal indicative of the angle of rotation of said support shaft, said receiver member receiving said angle signal for providing an indication of the performance of the tool being tested relative to the angle of rotation of said support shaft by the tool being tested.

23. The system of claim 22 with said controller means receiving data of desired torque load patterns and for providing said control signals of a magnitude to vary the magnitude of electrical current from said electrical power means to provide variations in the magnitude of said magnetic field to simulate said torque load patterns.

24. A torque load simulator system for testing and determining the performance of a torque applying tool relative to a preselected standard, comprising:

a controllable magnetorheological fluid torque coupling apparatus, said apparatus comprising at least two relatively spaced, magnetically permeable members, said members rotatably movable relative to each other, a magnetorheological fluid occupying a space between said members for transmitting torque between said members, said fluid providing an increase in yield strength in shear in response to increases in the magnitude of an applied magnetic field, and electromagnetic means responsive to electrical excitation current for applying the magnetic field between said members and to said fluid for varying the magnitude of torque transmission between said members by said fluid in response to variations in the magnitude of the applied magnetic field, said members including a rotor member and a housing member, said housing member having a cavity with said rotor member being rotatably supported in said cavity, said space occupied by said fluid being generally defined in said cavity by the clearance between said rotor member and said housing member, said rotor member having a plate structure with a preselected cross-section, said cavity having a similar cross-section, said electromagnetic means applying the magnetic field into said space and between said plate structure and said housing member through said magnetorheological fluid, said clearance between said plate structure and said housing member selected to concentrate the magnetic field at the radially outer end of said plate structure and said cavity, electrical power means for providing the electrical excitation current to said electromagnetic means in response to control signals, controller means for providing said control signals to said electrical power means and being selectively controllable to provide predetermined variations in magnitude of the electrical current to provide related variations in the magnitude of said magnetic field and hence in the magnitude of the shear strength in yield of said fluid in a manner simulating desired preselected torque load patterns, said rotor member having a support shaft rotatably supporting said rotor member with said housing member, said support shaft having an input end adapted to be connected to the torque applying tool to be tested, torque transducer means for measuring the magnitude of torque applied to said input end of said support shaft by the torque applying tool being tested and for providing a torque signal indicative of the magnitude of the applied torque to said support shaft, a receiver member for receiving said torque signal from said torque transducer and for receiving said control signals from said controller means indicative of the magnitude of electrical excitation current whereby an indication of the performance of the torque applying tool being tested can be measured relative to the preselected standard.

* * * * *

UNITED STATES PATENT AND TRADEMARK OFFICE
CERTIFICATE OF CORRECTION

PATENT NO. : 5,598,908
DATED : February 4, 1997
INVENTOR(S) : Todd M. York et al.

It is certified that error appears in the above-identified patent and that said Letters Patent is hereby corrected as shown below:

On the title page, item [73], after the address of the assignee insert --Part Interest--

Signed and Sealed this

Sixteenth Day of December, 1997

Attest:

BRUCE LEHMAN

Attesting Officer

Commissioner of Patents and Trademarks